(12) United States Patent
Minami

(10) Patent No.: US 11,317,007 B2
(45) Date of Patent: Apr. 26, 2022

(54) IMAGE OUTPUT SYSTEM, SERVER APPARATUS, AND IMAGE OUTPUT APPARATUS

(71) Applicant: FUJIFILM Business Innovation Corp., Tokyo (JP)

(72) Inventor: Yoshitomo Minami, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 194 days.

(21) Appl. No.: 16/442,571

(22) Filed: Jun. 17, 2019

(65) Prior Publication Data

US 2020/0007714 A1 Jan. 2, 2020

(30) Foreign Application Priority Data

Jun. 27, 2018 (JP) .............................. JP2018-121538

(51) Int. Cl.
*G06K 15/22* (2006.01)
*H04N 1/44* (2006.01)
*H04N 1/00* (2006.01)

(52) U.S. Cl.
CPC ........... *H04N 1/444* (2013.01); *H04N 1/0097* (2013.01); *H04N 1/00209* (2013.01); *H04N 1/00244* (2013.01); *H04N 1/442* (2013.01); H04N 2201/0094 (2013.01)

(58) Field of Classification Search
CPC .............. H04N 1/444; H04N 1/00209; H04N 1/00244; H04N 1/0097; H04N 1/442; H04N 2201/0094; H04N 2201/0096
See application file for complete search history.

(56) References Cited

U.S. PATENT DOCUMENTS

| 2003/0195814 A1* | 10/2003 | Striemer ............ G06Q 30/0641 705/26.8 |
| 2018/0157448 A1* | 6/2018 | Takaoka ................ G06F 3/1204 |
| 2018/0220042 A1* | 8/2018 | Kosaka .............. H04N 1/32101 |

FOREIGN PATENT DOCUMENTS

| JP | 2017111542 | 6/2017 |
| JP | 2017224092 | 12/2017 |
| JP | 2017224092 A | * 12/2017 |

* cited by examiner

*Primary Examiner* — Moustapha Diaby
(74) *Attorney, Agent, or Firm* — JCIPRNET

(57) ABSTRACT

An image output system includes a section that stores registration information in which feature information of a registered user and a target file registered by the registered user are associated with each other, a section that acquires feature information of a current user requesting an output of an image of the target file, a section that obtains an authentication result indicating whether or not two pieces of feature information satisfy a predetermined coincidence condition, by comparing the feature information of the current user to the feature information of the registered user, and a section that controls the output of the image of the target file in accordance with the authentication result.

9 Claims, 8 Drawing Sheets

FIG. 7A

BEFORE IDENTIFICATION DATA IS ACQUIRED

| IDENTIFICATION DATA | FEATURE INFORMATION (FEATURE AMOUNT) | TERMINAL IDENTIFIER | TARGET FILE (SUBSTANCE) |
|---|---|---|---|
| xxxxxx | USER 1 | fffff | FILE 1 |
| yyyyyy | USER 1 | ttttt | FILE 2 |
| ... | ... | ... | ... |
| ... | ... | ... | ... |

FIG. 7B

AFTER IDENTIFICATION DATA IS ACQUIRED

| IDENTIFICATION DATA | FEATURE INFORMATION (FEATURE AMOUNT) | TERMINAL IDENTIFIER | TARGET FILE (SUBSTANCE) |
|---|---|---|---|
| xxxxxx | USER 1 | fffff | FILE 1 |
| yyyyyy | USER 1 | ttttt | FILE 2 |
| zzzzzz | ... | ... | ... |
| ... | ... | ... | ... |

FIG. 8A

AFTER ATTRIBUTE INFORMATION IS ACQUIRED

| IDENTIFICATION DATA | FEATURE INFORMATION (FEATURE AMOUNT) | TERMINAL IDENTIFIER | TARGET FILE (SUBSTANCE) |
|---|---|---|---|
| xxxxxx | USER 1 | fffff | FILE 1 |
| yyyyyy | USER 1 | ttttt | FILE 2 |
| zzzzzz | USER 2 | rrrrr | ... |
| ... | ... | ... | ... |

FIG. 8B

AFTER TARGET FILE IS ACQUIRED

| IDENTIFICATION DATA | FEATURE INFORMATION (FEATURE AMOUNT) | TERMINAL IDENTIFIER | TARGET FILE (SUBSTANCE) |
|---|---|---|---|
| xxxxxx | USER 1 | fffff | FILE 1 |
| yyyyyy | USER 1 | ttttt | FILE 2 |
| zzzzzz | USER 2 | rrrrr | FILE 3 |
| ... | ... | ... | ... |

IMAGE OUTPUT SYSTEM, SERVER APPARATUS, AND IMAGE OUTPUT APPARATUS

CROSS-REFERENCE TO RELATED APPLICATIONS

This application is based on and claims priority under 35 USC 119 from Japanese Patent Application No. 2018-121538 filed Jun. 27, 2018.

BACKGROUND

(i) Technical Field

The present invention relates to an image output system, a server apparatus, and an image output apparatus.

(ii) Related Art

JP2017-224092A discloses an information processing system in which it is possible to improve accuracy of user authentication by the identical user terminal acquiring biometric information at time of registration and at time of authentication.

JP2017-111542A discloses an information processing terminal that compares picture data acquired from an SNS site to picture data received from a portable terminal, and prohibits using of a service in a case where a comparison result shows that these pieces of picture data are not similar to each other.

SUMMARY

As disclosed in JP2017-224092A and JP2017-111542A, the technology of obtaining an authentication result of a user by using biometric information or picture data of the user is known. For example, a system that outputs an image of a target file registered in a server apparatus or the like, from an image output apparatus or the like is also known.

Aspects of non-limiting embodiments of the present disclosure relate to an image output system, a server apparatus, and an image output apparatus in which, in a case where an output of an image of a registered target file is controlled, the control is realized in accordance with an authentication result obtained from feature information of a registered user associated with the target file and feature information of the current user requesting an output of an image of the target file.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image output system which includes a section that stores registration information in which feature information of a registered user and a target file registered by the registered user are associated with each other, a section that acquires feature information of a current user requesting an output of an image of the target file, a section that obtains an authentication result indicating whether or not two pieces of feature information satisfy a predetermined coincidence condition, by comparing the feature information of the current user to the feature information of the registered user, and a section that controls the output of the image of the target file in accordance with the authentication result.

BRIEF DESCRIPTION OF THE DRAWINGS

Exemplary embodiment (s) of the present invention will be described in detail based on the following figures, wherein:

FIGS. 7A and 7B are diagrams illustrating a specific example of attribute information managed by the image output apparatus 300; and FIGS. 8A and 8B are diagrams illustrating another specific example of the attribute information managed by the image output apparatus 300.

DETAILED DESCRIPTION

Figure 1:
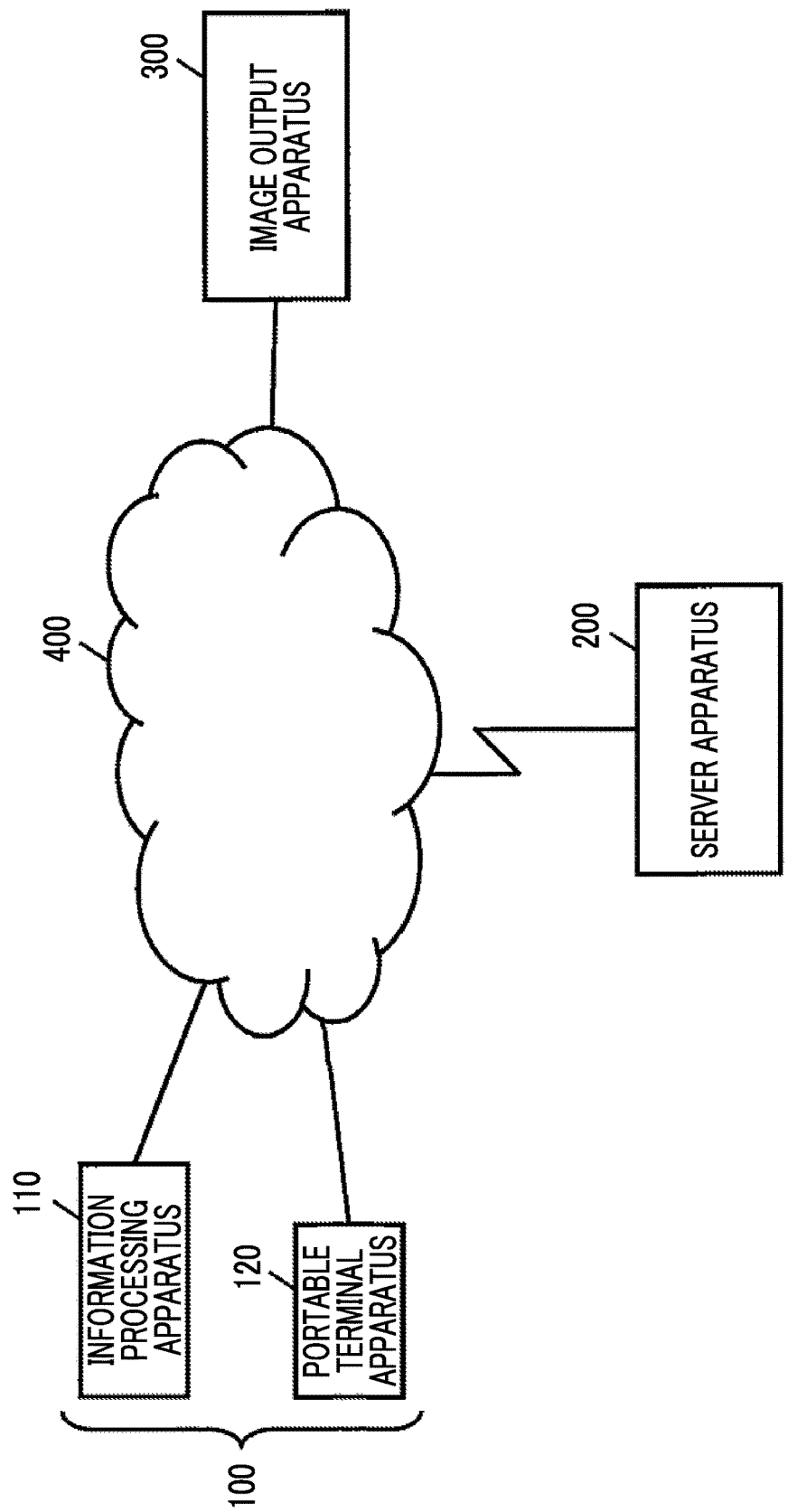
FIG. 1 is a diagram illustrating a specific example of an image output system.

FIG. 1 is a diagram illustrating an example of a specific exemplary embodiment of the present invention. FIG. 1 illustrates a specific example of an image output system including a user apparatus 100, a server apparatus 200, and an image output apparatus 300. In the specific example illustrated in FIG. 1, the user apparatus 100, the server apparatus 200, and the image output apparatus 300 are connected to each other, for example, via a communication line (line using at least one of a wireless communication or a wired communication) 400, so as to transmit and receive data (information) to and from each other.

The user apparatus 100 is an apparatus used by a user of the image output system illustrated in FIG. 1. FIG. 1 illustrates an information processing apparatus 110 such as a personal computer, and a portable terminal apparatus 120 such as a smart phone or a tablet terminal, as a specific example of the user apparatus 100.

The server apparatus 200 stores and manages a target file registered from a user (registered user) via the user apparatus 100. The server apparatus 200 outputs data of a target file to the image output apparatus 300, in response to an output request from a user (current user) requesting an image output of the target file. Here, the reason that a registered user and the current user as the user are distinguished from each other is as follows. That is, a user currently requesting an image output is not limited to a user who has registered a target file relating to the image output or a user possessing the target file.

The image output apparatus 300 outputs an image of a target file corresponding to the output request from the user (current user). One of specific examples of the image output apparatus 300 is a multifunction type apparatus including plural image output functions (at least one function of a printing function, a scanner function, a copying function, a facsimile (FAX) function, and the like). For example, in a case where the image output apparatus 300 is a multifunction type apparatus, the image output apparatus 300 may be installed at a company, a school, or the like and be used by customers of the company or the school. The image output apparatus 300 may be installed in a store such as a convenience store and be used by an unspecified number of customers. The image output apparatus 300 may be an apparatus including only one function of the plural image output functions.

Figure 2:
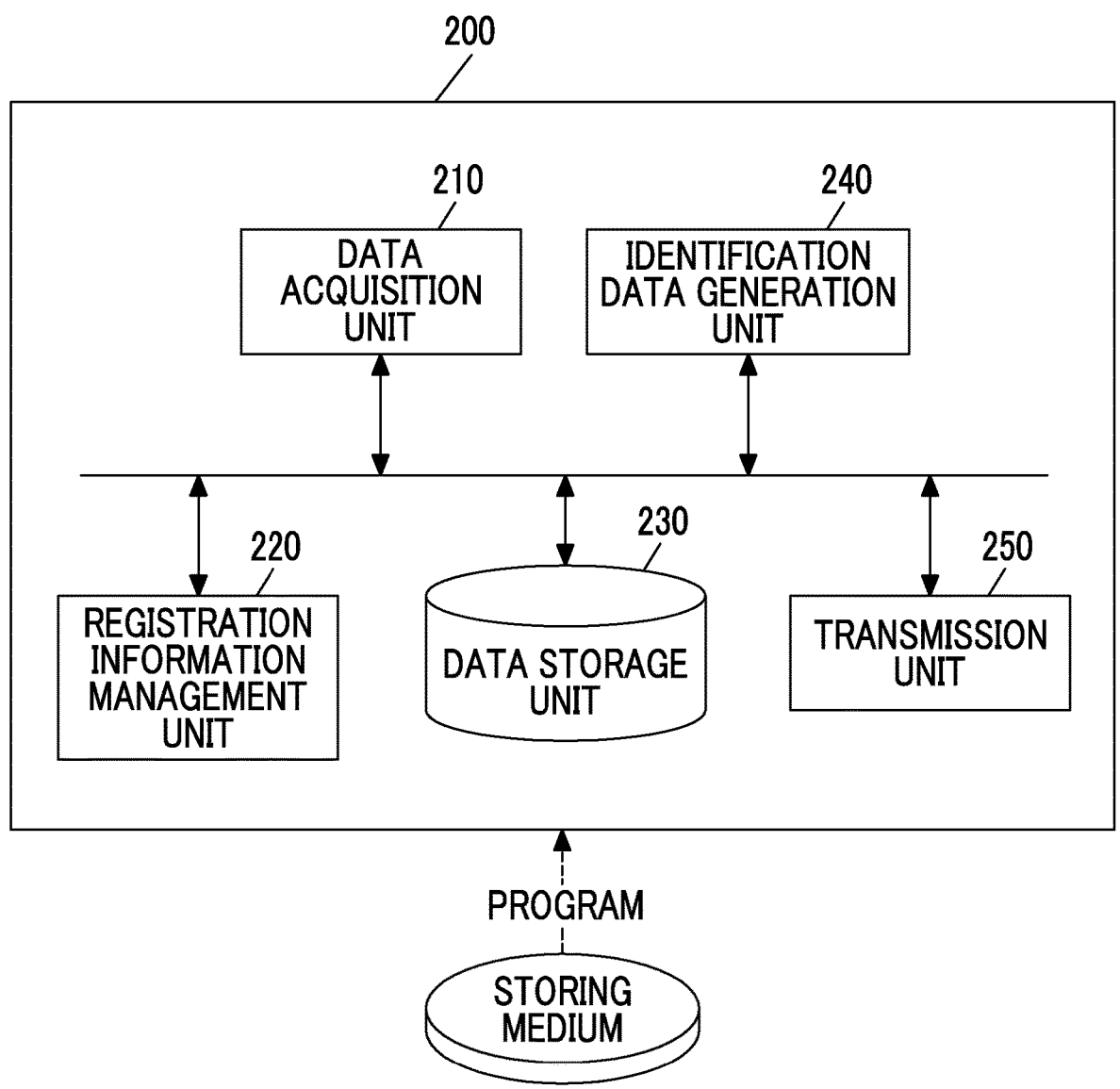
FIG. 2 is a diagram illustrating a specific example of a server apparatus 200.

FIG. 2 is a diagram illustrating a specific example of the server apparatus 200 (FIG. 1). In the specific example illustrated in FIG. 2, the server apparatus 200 includes a data acquisition unit 210, a registration information management unit 220, a data storage unit 230, an identification data generation unit 240, and a transmission unit 250.

The data acquisition unit 210 acquires feature information of a user (registered user) and a target file registered by the user. The data acquisition unit 210 receives and acquires the feature information and the target file which are transmitted from a user apparatus 100 used by the registered user and are obtained via the communication line 400, by using a communication device or the like, for example.

The feature information of a user refers to, for example, characteristic information unique to the user. The feature information of a user is used for uniquely distinguishing a specific user from plural users, for example. Specific examples of the feature information of a user include a feature amount obtained from a face image of a user, a feature amount obtained from voice of the user, a feature amount obtained from the fingerprint of the user, and biometric information obtained from the user.

The registration information management unit 220 manages registration information in which the feature information and the target file of the user (registered user), which have been acquired by the data acquisition unit 210 have been associated with each other. The registration information managed by the registration information management unit 220 is stored in the data storage unit 230.

The data storage unit 230 stores the registration information managed by the registration information management unit 220. The data storage unit 230 may store various kinds of data used by the server apparatus 200. The data storage unit 230 may be realized, for example, by using a storage device such as a hard disk drive or a semiconductor memory.

The identification data generation unit 240 generates identification data corresponding to the registration information. The identification data generation unit 240 generates identification data unique to specific registration information, in order to uniquely distinguish the specific registration information from plural pieces of registration information, for example. For example, the data storage unit 230 stores plural pieces of registration information, and the identification data generation unit 240 generates identification data corresponding to each of the plural pieces of registration information. The registration information management unit 220 manages an association of one piece of registration information with identification data of the registration information.

The transmission unit 250 transmits the identification data to the user apparatus 100. The transmission unit 250 transmits the identification data by using a communication device, for example. The transmitted identification data is provided for the user apparatus 100 used by the user via the communication line 400, for example. The provided identification data is stored in the portable terminal apparatus 120 used by the user, for example. For example, the identification data may be transmitted to the portable terminal apparatus 120 of the user from the transmission unit 250 via the communication line 400. The identification data may be transmitted to the information processing apparatus 110 of the user from the transmission unit 250 via the communication line 400, and then the identification data may be provided for the portable terminal apparatus 120 from the information processing apparatus 110.

The transmission unit 250 transmits the target file to the image output apparatus 300. The transmission unit 250 transmits data of the target file to the image output apparatus 300, for example, by using a communication device. The transmitted data of the target file is provided for the image output apparatus 300 via the communication line 400, for example.

The server apparatus 200 in the specific example illustrated in FIG. 2 may be realized by using one or more computers, for example. The computer includes hardware resources, for example, an arithmetic operational device such as a CPU, a storage device such as a memory or hard disk, a communication device using a communication line such as the Internet, a writing device that reads data from a storage medium such as an optical disk, a semiconductor memory, or a card memory and writes the data, and a display device such as a display, and an operation device that receives an operation from a user.

For example, the computer reads a program (software) corresponding to a function of at least one of plural components which are provided in the server apparatus 200 illustrated in FIG. 2 and are denoted by reference signs. At least a function of the server apparatus 200 illustrated in FIG. 2 is realized by the computer, in cooperation with the hardware resources of the computer and the read software. The program may be provided for the computer (server apparatus 200) via the communication line such as the Internet, for example. The program may be stored in a storage medium such as an optical disk, a semiconductor memory, or a card memory, and then be provided for the computer (server apparatus 200).

Figure 3:
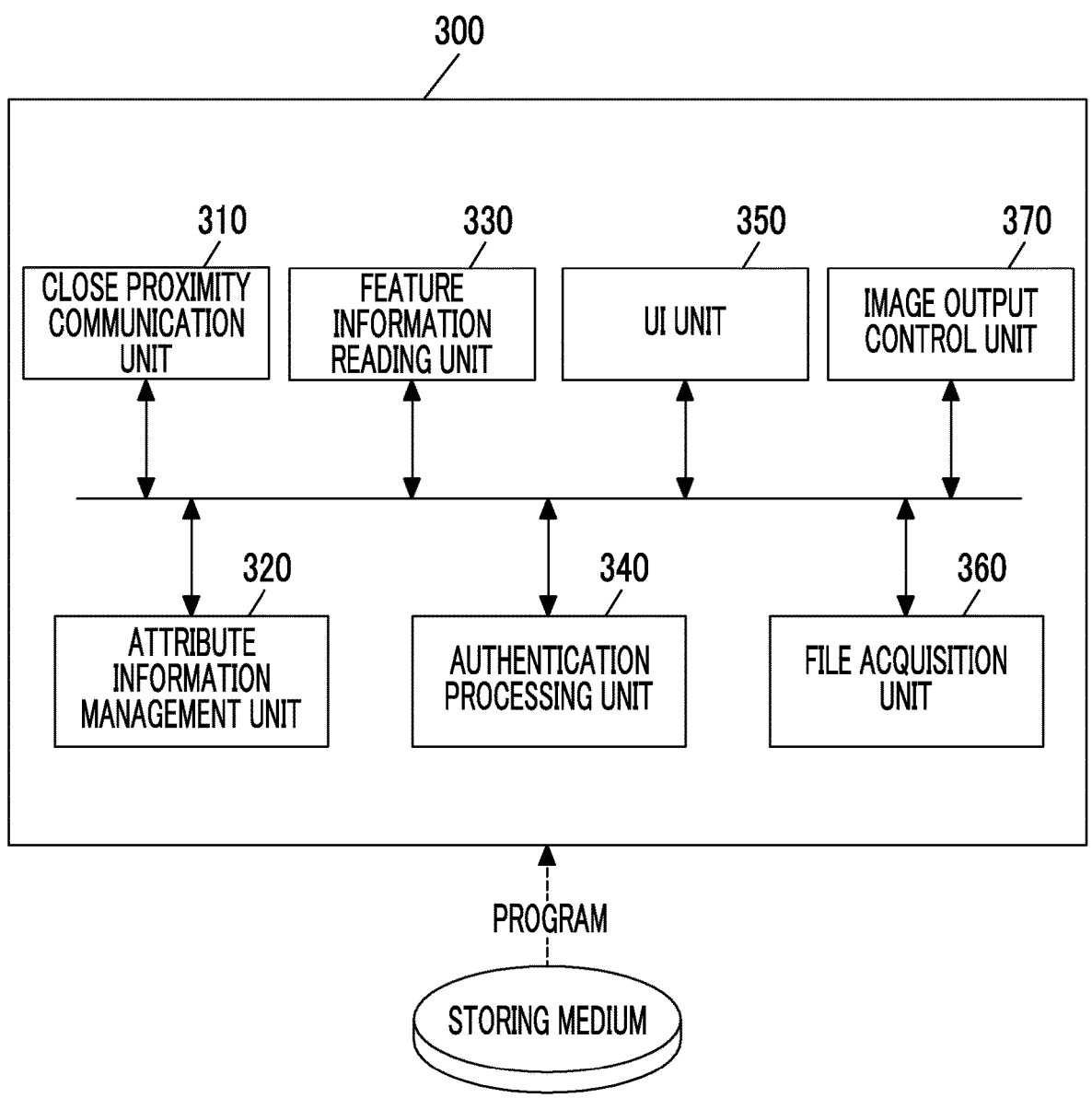
FIG. 3 is a diagram illustrating a specific example of an image output apparatus 300.

FIG. 3 is a diagram illustrating a specific example of the image output apparatus 300 (FIG. 1). In the specific example illustrated in FIG. 3, the image output apparatus 300 includes a close proximity communication unit 310, an attribute information management unit 320, a feature information reading unit 330, an authentication processing unit 340, a UI unit 350, a file acquisition unit 360, and an image output control unit 370.

The close proximity communication unit 310 receives identification data of registration information in which the feature information of a registered user and a target file registered by the registered user have been associated, from the portable terminal apparatus 120 in close proximity communication. The close proximity communication unit 310 acquires identification data which has been transmitted from the server apparatus 200 and stored in the portable terminal apparatus 120, in close proximity communication.

The close proximity communication includes communication at a distance of about several centimeters to several tens of meters, for example. Specific examples of the close proximity communication performed by the close proximity communication unit 310 include communications based on the standards of Bluetooth (registered trademark), Bluetooth low energy (BLE), near-field communication (NFC), and the like.

The attribute information management unit 320 acquires and manages the feature information of the registered user, which is included in registration information corresponding to the identification data received by the close proximity communication unit 310. The attribute information management unit 320 acquires the feature information of the registered user, which is included in the registration information corresponding to the identification data received by the close proximity communication unit 310, from plural pieces of registration information managed by the server apparatus 200. The attribute information management unit 320 acquires the feature information, for example, by transmitting and receiving data via the communication line 400.

The feature information reading unit 330 acquires feature information of a user requesting an image output of a target file. The feature information reading unit 330 acquires feature information of a user (current user) using the portable terminal apparatus 120, for example. The feature information reading unit 330 acquires the feature information of the current user in a manner of corresponding to the feature information of the registered user, which has been stored in the server apparatus 200 and managed, for example.

For example, in a case where the feature amount obtained from a face image of the registered user is managed as the feature information of the registered user, the feature information reading unit 330 calculates the feature amount from the face image of the current user, which has been captured using a camera. In a case where the feature amount obtained from the voice of the registered user is managed as the feature information of the registered user, the feature information reading unit 330 calculates the feature amount from the voice of the current user, which has been recorded by using a microphone, for example. In a case where the feature amount obtained from the fingerprint of the registered user is managed as the feature information of the registered user, the feature amount may be calculated from the fingerprint of the current user. In a case where specific biometric information obtained from the registered user is managed as the feature information of the registered user, the specific biometric information may be read from the current user.

The authentication processing unit 340 obtains an authentication result indicating whether or not the feature information of the registered user and the feature information of the current user satisfy a predetermined coincidence condition, by comparing the two pieces of feature information to each other. The authentication processing unit 340 compares, for example, the feature information of the current user, which has been acquired by the feature information reading unit 330, to the feature information of the registered user, which has been acquired by the attribute information management unit 320. Further, the authentication processing unit 340 may, for example, calculate similarity between the feature information of the registered user and the feature information of the current user, by comparing the two pieces of feature information to each other. In a case where the calculated similarity exceeds a predetermined threshold, the authentication processing unit 340 may obtain the authentication result indicating that the registered user coincides with (is identical to) the current user. In a case where the calculated similarity does not exceed the predetermined threshold, the authentication result indicating that the registered user does not coincide with (is not identical to) the current user may be obtained.

The UI (user interface) unit 350 functions as a user interface of a user using the image output apparatus 300. The UI unit 350 displays the authentication result obtained by the authentication processing unit 340, for example. For example, in a case where an authentication result indicating the registered user coincides with the current user is obtained, an image indicating that an image output of the target file by the current user is permitted may be displayed. For example, in a case where an authentication result indicating that the registered user does not coincide with the current user, an image indicating that the image output of the target file by the current user is not permitted may be displayed.

The file acquisition unit 360 acquires a target file. For example, the file acquisition unit 360 acquires a target file provided in registration information corresponding to identification data received by the close proximity communication unit 310, from plural files managed by the server apparatus 200. The file acquisition unit 360 acquires a target file by transmitting and receiving data via the communication line 400.

For example, the file acquisition unit 360 may acquire a target file in a case where the authentication result indicating that the registered user coincides with the current user is obtained, and may not acquire the target file in a case where the authentication result indicating that the registered user does not coincide with the current user is obtained. The file acquisition unit 360 may acquire a target file included in registration information corresponding to identification data after the close proximity communication unit 310 receives identification data, before the authentication processing unit 340 obtains an authentication result.

The image output control unit 370 controls the image output of a target file in accordance with the authentication result obtained from the authentication processing unit 340. For example, in a case where the authentication result indicating the registered user coincides with the current user is obtained, the image output control unit 370 permits the image output of the target file. In addition, in a case where the authentication result indicating that the registered user does not coincide with the current user is obtained, the image output control unit 370 prohibits the image output of the target file. For example, in a case of the authentication result indicating that the registered user does not coincide with the current user, the image output control unit 370 may prohibit the image output of the target file, and display a message of recommending performing authentication again, in the UI unit 350.

The image output apparatus 300 in the specific example illustrated in FIG. 3 may be realized by using one or more computers, for example. The computer includes hardware resources, for example, an arithmetic operational device such as a CPU, a storage device such as a memory or hard disk, a communication device using a communication line such as the Internet, a writing device that reads data from a storage medium such as an optical disk, a semiconductor memory, or a card memory and writes the data, and a display device such as a display, and an operation device that receives an operation from a user.

For example, the computer reads a program (software) corresponding to a function of at least one of plural components which are provided in the image output apparatus 300 illustrated in FIG. 3 and are denoted by reference signs. At least a function of the image output apparatus 300 illustrated in FIG. 3 is realized by the computer, in cooperation with the hardware resources of the computer and the read software. The program may be provided for the computer (image output apparatus 300) via the communication line such as the Internet, for example. The program may be stored in a storage medium such as an optical disk, a semiconductor memory, or a card memory, and then be provided for the computer (image output apparatus 300).

The entire configuration of the image output system (including the server apparatus 200 illustrated in FIG. 2 and the image output apparatus 300 illustrated in FIG. 3) illustrated in FIG. 1 is described above. Next, a specific example of processing realized by the image output system in FIG. 1 will be described in detail. The reference signs in FIGS. 1 to 3 are used for the components illustrated in FIGS. 1 to 3, in the following descriptions.

Figure 4:
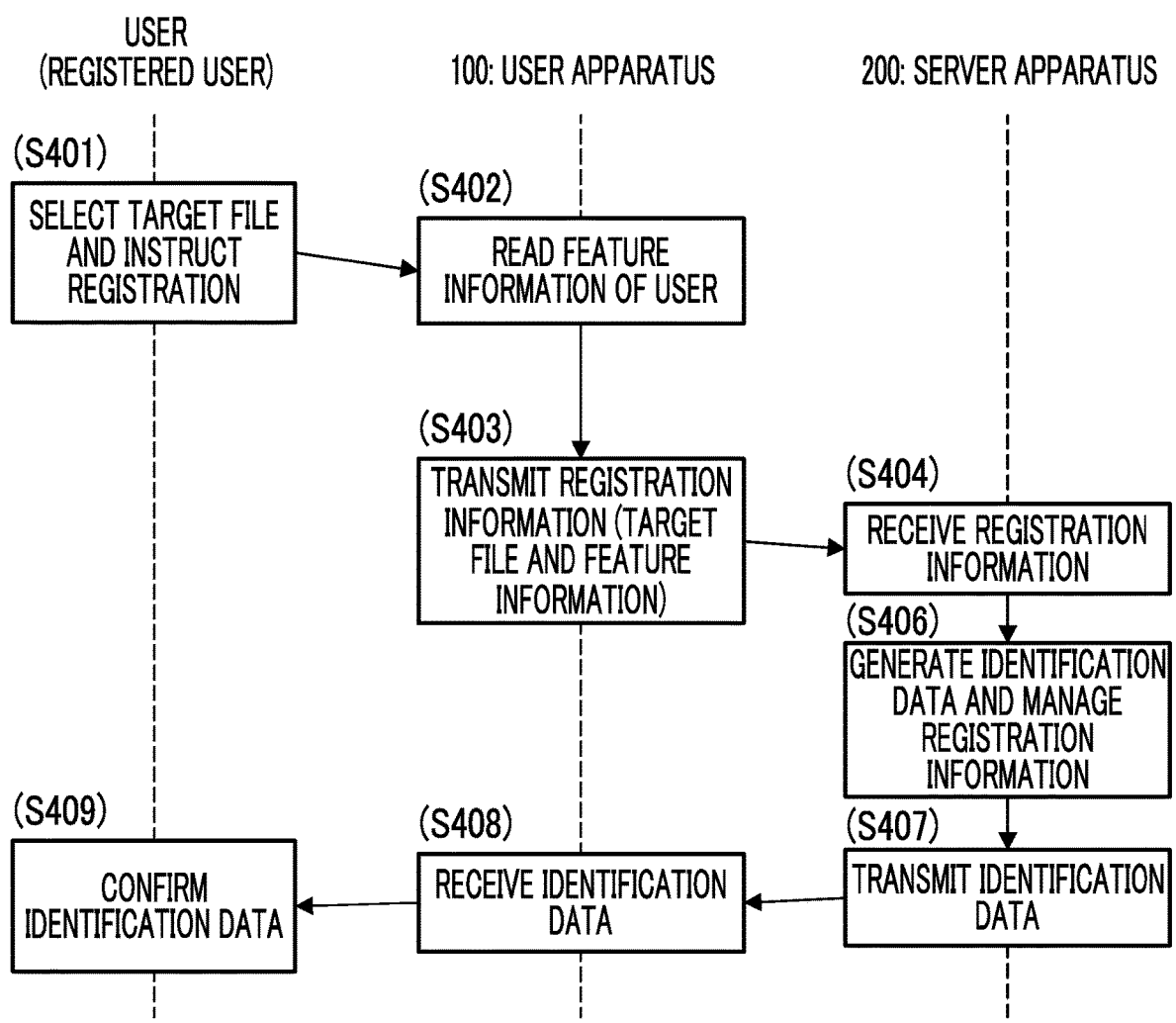
FIG. 4 is a diagram illustrating a specific example of processing when a file is registered.

FIG. 4 is a diagram illustrating a specific example of processing when a file is registered. A user who desires an output of an image (including an image of only text or only symbols) of a file by using the image output apparatus 300 firstly selects a file as a target of an image output and instructs the server apparatus 200 to register the file (S401). For example, the user (registered user) selects a file (target file) as a target of an image output and instructs the server apparatus 200 to register the file, by using the user apparatus 100 (information processing apparatus 110 or portable terminal apparatus 120).

In a case where an instruction to register the target file is performed, the user apparatus 100 reads feature information of the registered user (S402). For example, in a case where the feature amount obtained from a face image of the registered user is used as the feature information of the registered user, the feature amount is obtained from the face image of the registered user, which has been captured by using a camera provided in the information processing apparatus 110 or the portable terminal apparatus 120. In a case where the feature amount obtained from the voice of the registered user is used as the feature information of the registered user, the feature amount is obtained from the voice of the registered user, which has been recorded by using a microphone provided in the information processing apparatus 110 or the portable terminal apparatus 120. Image data of the face image or sound data of the voice itself may be used as the feature information. The feature amount obtained from the fingerprint of the registered user or the biometric information obtained from the registered user may be used as the feature information.

In a case where the feature information of the registered user is obtained, the user apparatus 100 (information processing apparatus 110 or portable terminal apparatus 120) transmits registration information to the server apparatus 200 (S403). In the registration information, the target file as a target of a registration instruction from the registered user and the feature information of the registered user have been associated with each other. The data acquisition unit 210 in the server apparatus 200 receives the registration information transmitted from the user apparatus 100 (S404).

In a case where the data acquisition unit receives the registration information, the identification data generation unit 240 in the server apparatus 200 generates identification data corresponding to the received registration information. The registration information management unit 220 in the server apparatus 200 manages the registration information and the identification data in association with each other (S406).

The identification data is transmitted and received between the portable terminal apparatus 120 and the image output apparatus 300, in close proximity communication. Thus, the identification data has a data volume allowing transmission and reception in the close proximity communication. For example, in a case where Bluetooth low energy (BLE) is used for the close proximity communication, the identification data has a data volume allowing transmission and reception in BLE. For example, a reservation number of printing used in an online printing service may be used as the identification data. A universally unique identifier (UUID) may be used as the identification data so long as the UUID allows transmission and reception in the close proximity communication.

The registration information managed by the registration information management unit 220 is assumed to be used within several hours, for example. Thus, the registration information management unit 220 may delete registration information after several hours (or several days) has elapsed from registration of the registration information.

In a case where the identification data is generated, the transmission unit 250 in the server apparatus 200 transmits the identification data generated in S406 to the user apparatus 100 (S407). Then, the user apparatus 100 (information processing apparatus 110 or portable terminal apparatus 120) receives the identification data (S408). The received identification data is stored in the portable terminal apparatus 120. The registered user confirms receiving of the identification data (S409), and then the processing when the file is registered, which is illustrated in FIG. 4 ends.

A user who desires the image output apparatus 300 to output the target file registered in the server apparatus 200 holds the portable terminal apparatus 120 storing identification data corresponding to the target file and is directed to a place in which the image output apparatus 300 has been installed.

Figure 5:
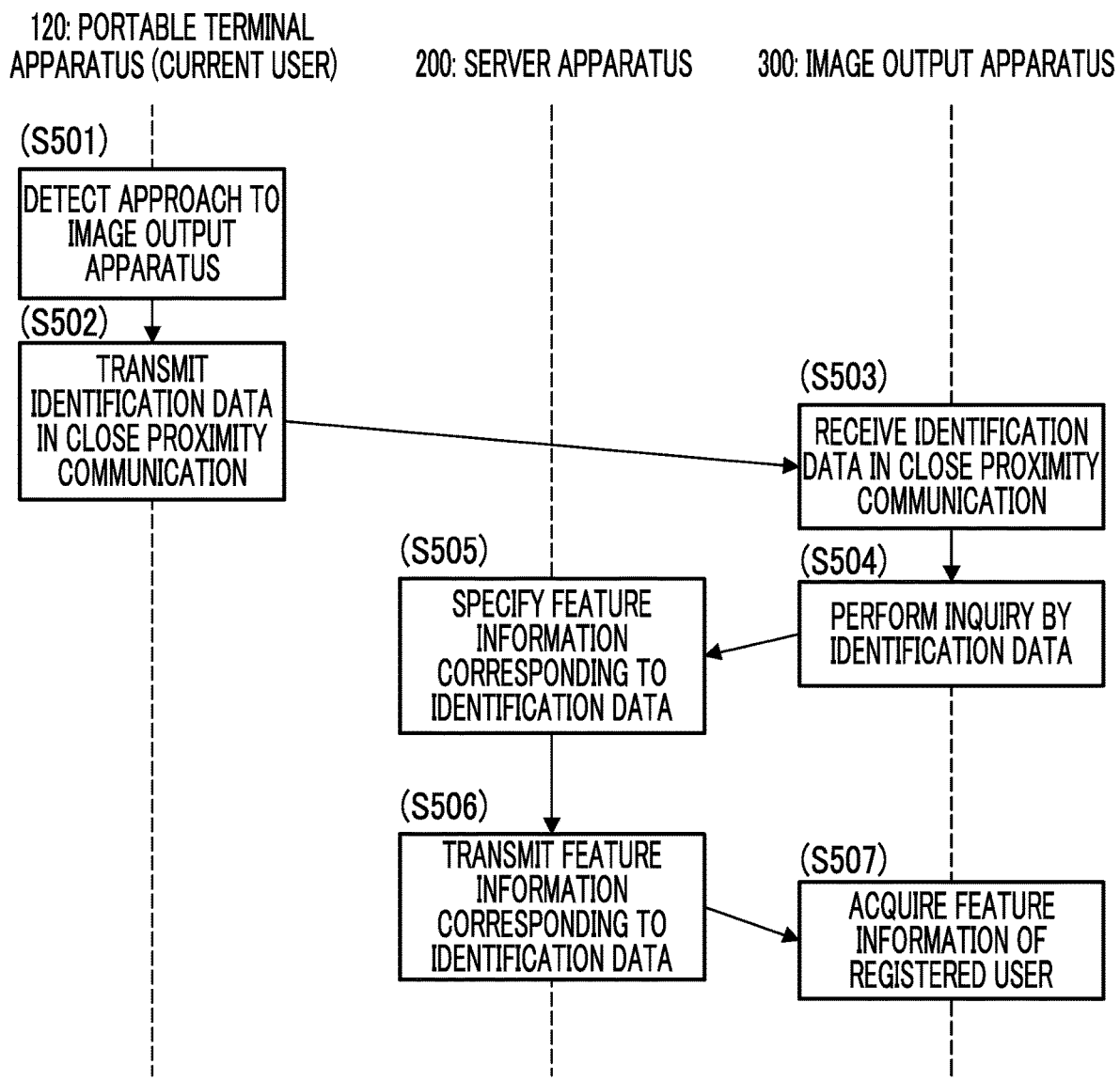
FIG. 5 is a diagram illustrating a specific example of processing when a user approaches the image output apparatus 300.

FIG. 5 is a diagram illustrating a specific example of processing when the user approaches the image output apparatus 300. In a case where the user (current user) holding the portable terminal apparatus 120 approaches the image output apparatus 300, the portable terminal apparatus 120 detects an approach to the image output apparatus 300 (S501). For example, the portable terminal apparatus 120 detects that the user becomes close to a threshold distance, by close proximity communication with the image output apparatus 300. The threshold distance may be determined, for example, in accordance with a communication speed between the portable terminal apparatus 120 and the image output apparatus 300, or density of stores and the like in which the image output apparatus 300 has been installed.

In a case where the portable terminal apparatus 120 detects the approach to the image output apparatus 300, the portable terminal apparatus 120 transmits identification data stored in the portable terminal apparatus to the image output apparatus 300 in close proximity communication (S502). The portable terminal apparatus 120 transmits the identification data to the image output apparatus 300 in a manner of a push notification by the close proximity communication, for example. The close proximity communication unit 310 in the image output apparatus 300 receives the identification data transmitted from the portable terminal apparatus 120, in close proximity communication (S503). For example, a communication based on the standard of Bluetooth low energy (BLE) may be used as the close proximity communication between the portable terminal apparatus 120 and the image output apparatus 300.

In a case where the image output apparatus 300 acquires the identification data from the portable terminal apparatus 120, the image output apparatus 300 inquires feature information corresponding to the identification data, to the server apparatus 200 (S504). The server apparatus 200 specifies the feature information which corresponds to the identification data and matches with the inquiry from the image output apparatus 300 (S505). Then, the server apparatus 200 transmits the feature information corresponding to the identification data to the image output apparatus 300 (S506). For example, the registration information management unit 220 in the server apparatus 200 searches for registration information which corresponds to the identification data and matches with the inquiry, from plural pieces of registration information stored in the data storage unit 230. Then, the transmission unit 250 in the server apparatus 200 transmits feature information of the registered user, which has been included in the registration information, to the image output apparatus 300.

In this manner, the image output apparatus 300 receives and acquires the feature information of the registered user from the server apparatus 200 (S507), and then the processing when approaching the image output apparatus 300, which is illustrated in FIG. 5 ends.

At a time point at which the processing illustrated in FIG. 5 ends, the user (current user) may not arrive in the place (store or the like) in which the image output apparatus 300 has been installed. At the time point at which the processing illustrated in FIG. 5 ends, data of the target file corresponding to the identification data may be provided for (downloaded in) the image output apparatus 300. For example, in the process of S506, the target file corresponding to the identification data along with the feature information corresponding to the identification data may be transmitted to the image output apparatus 300.

The image output apparatus 300 may store and manage the previous use records obtained by plural portable terminal apparatuses 120, and, in the process of S506, the target file along with the feature information may be provided for the image output apparatus 300 only in a case where the previous use record obtained by the portable terminal apparatus 120 used by the current user is provided.

According to the specific example illustrated in FIG. 5, the identification data is transmitted to the image output apparatus 300 only by the user who holds the portable terminal apparatus 120 approaching the image output apparatus 300. Therefore, a burden on a user operation for inputting identification data to the image output apparatus 300 is reduced in comparison to a case where the identification data is not transmitted. For example, the user operation for inputting identification data to the image output apparatus 300 may not be performed at all, by transmitting the identification data to the image output apparatus 300.

Figure 6:
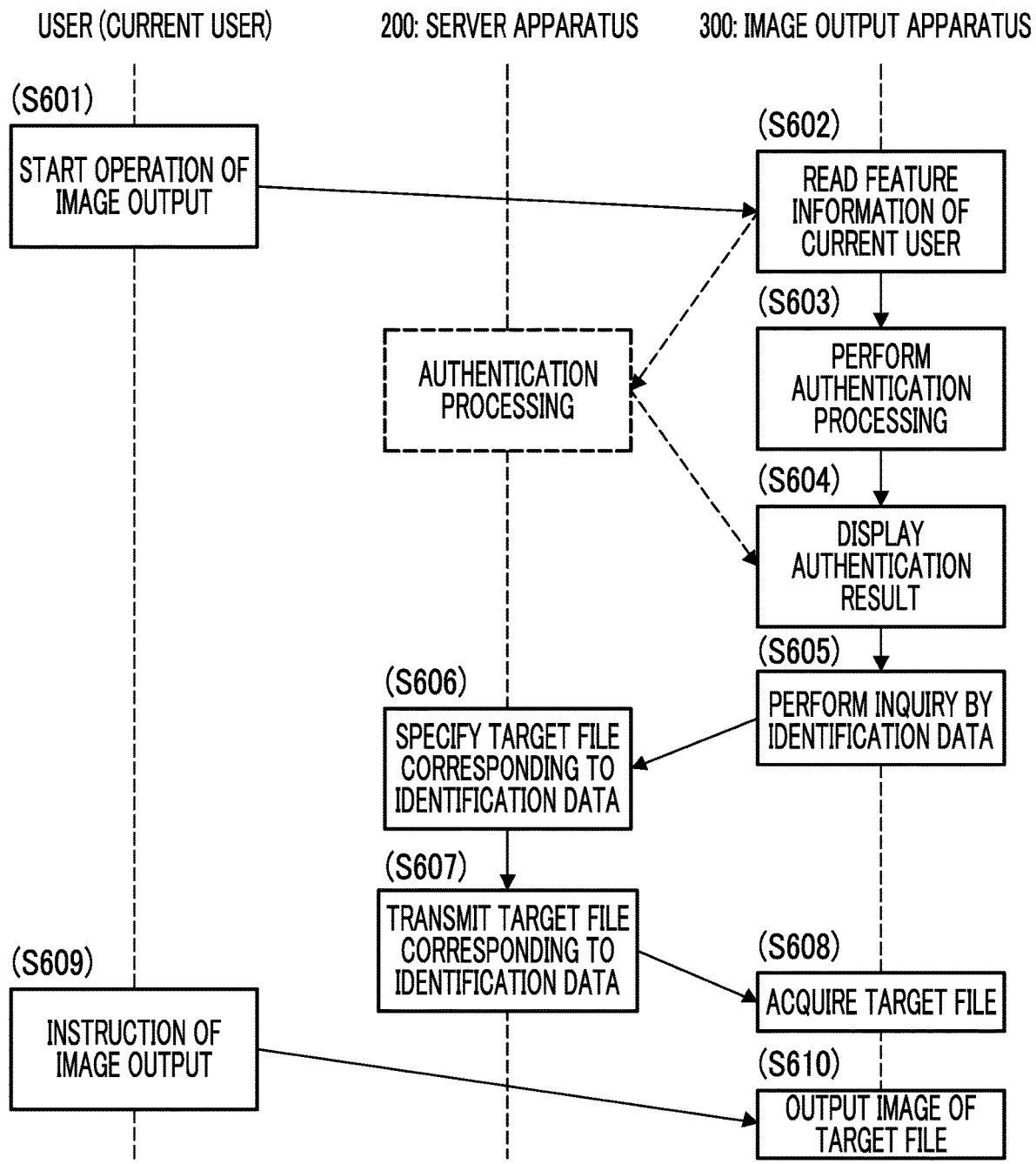
FIG. 6 is a diagram illustrating a specific example of processing when an image is output.

FIG. 6 is a diagram illustrating a specific example of processing when an image is output. In a case where the current user arrives in the place (store or the like) in which the image output apparatus 300 has been installed, the current user starts an operation of an image output of the target file, which is performed by the image output apparatus 300 (S601).

In a case where the operation of the image output is started, the image output apparatus 300 reads feature information of the current user (S602). For example, the feature information reading unit 330 in the image output apparatus 300 acquires the feature information of the current user requesting the image output of the target file. The feature information reading unit 330 acquires the feature information of the current user in a manner of corresponding to the feature information of the registered user, which has been stored in the server apparatus 200 and managed, for example.

For example, in a case where the feature amount obtained from a face image of the registered user is used as the feature information of the registered user, the feature amount is obtained from a face image of the current user, which has been captured by using the camera provided in the image output apparatus 300, as the feature information of the current user. In a case where the feature amount obtained from the voice of the registered user is used as the feature information of the registered user, the feature amount is obtained from the voice of the current user, which has been recorded by using a microphone provided in the image output apparatus 300, as the feature information of the current user. In a case where image data of the face image or sound data of the voice itself, which relates to the registered user, is used as the feature information, image data of the face image or sound data of the voice itself, which relates to the current user, may be used as the feature information.

In a case where the feature information of the current user is obtained, authentication processing is performed (S603). For example, the authentication processing unit 340 in the image output apparatus 300 obtains an authentication result indicating whether or not the feature information of the registered user and the feature information of the current user satisfy the predetermined coincidence condition, by comparing the two pieces of feature information to each other. For example, the authentication processing unit 340 compares the feature information of the current user, which has been acquired by the feature information reading unit 330 in S602 in FIG. 6, to the feature information of the registered user, which has been acquired by the attribute information management unit 320 in S507 in FIG. 5. The authentication processing unit 340 obtains, for example, the authentication result indicating whether or not the registered user coincides with (is identical to) the current user. For example, the server apparatus 200 may perform the authentication processing of S603. That is, the server apparatus 200 may have a function of the authentication processing unit 340.

In a case where the authentication result is obtained, the authentication result is displayed in the UI unit 350 in the image output apparatus 300 (S604). For example, in a case where an authentication result indicating the registered user coincides with the current user is obtained, an image indicating that an image output of the target file by the current user is permitted may be displayed. For example, in a case where an authentication result indicating that the registered user does not coincide with the current user, an image indicating that the image output of the target file by the current user is not permitted may be displayed.

In a case where the authentication result indicating that the registered user coincides with the current user, the image output apparatus 300 inquires a target file corresponding to the identification data acquired in S503 (FIG. 5) to the server apparatus 200 (S605). The server apparatus 200 specifies the target file which corresponds to the identification data and matches with the inquiry from the image output apparatus 300 (S606). Then, the server apparatus 200 transmits the target file corresponding to the identification data to the image output apparatus 300 (S607).

For example, the registration information management unit 220 in the server apparatus 200 searches for registration information which corresponds to the identification data and matches with the inquiry, from plural pieces of registration information stored in the data storage unit 230. Then, the transmission unit 250 in the server apparatus 200 transmits data of the target file included in the registration information to the image output apparatus 300. Then, the file acquisition unit 360 in the image output apparatus 300 receives and acquires the target file.

In a case where the authentication result indicating that the registered user coincides with the current user, and an instruction of an image output from the current user is performed (S609), the image output apparatus 300 outputs an image of the target file (S610). For example, in a case where an instruction of an output by printing is performed as an instruction of the image output, the image output apparatus 300 performs outputting in a manner of printing the image of the target file on a medium such as paper. In this manner, the processing when the image is output, which is illustrated in FIG. 6 ends.

In the specific example illustrated in FIG. 6, for example, a communication connection between the portable terminal apparatus 120 and the image output apparatus 300 may be omitted or simplified. Thus, a burden on a user operation for a communication connection is reduced in comparison to a case where the communication connection is not omitted or simplified.

According to the specific example illustrated in FIG. 6, the image output apparatus 300 acquires the target file by using the identification data. Thus, a burden on a user operation for acquiring a target file is reduced in comparison to a case where the target file is not acquired by using the identification data. The user operation for acquiring the target file may not be provided.

According to the specific example illustrated in FIG. 6, for example, in a case where the current user different from the registered user uses the portable terminal apparatus 120 of the registered user, the authentication result indicating that the registered user does not coincide with the current user is obtained. Thus, the fraudulent image output of the target file performed by the current user different from the registered user is prohibited.

FIGS. 7A to 8B are diagrams illustrating specific examples of the attribute information managed by the attribute information management unit 320 in the image output apparatus 300. FIGS. 7A to 8B illustrate the specific examples in which attribute information regarding User 1 is already managed by the attribute information management unit 320, and new attribute information regarding User 2 is to be acquired.

In FIGS. 7A to 8B, identification data is acquired from the portable terminal apparatus 120 of the user in close proximity communication. Feature information refers to the feature amount of the registered user, which is obtained from the server apparatus 200. A terminal identifier is an identifier unique to the portable terminal apparatus 120 used by the registered user. The target file refers to the substance (image data) of a file registered in the server apparatus 200 by the registered user.

FIG. 7A illustrates attribute information before identification data of User 2 is acquired. In the specific example illustrated in FIG. 7A, identification data of "xxxxxx" is associated with feature information (feature amount) of User 1, "ffff" as a terminal identifier of a portable terminal apparatus 120 used by User 1, and File 1 registered in the server apparatus 200 by User 1. Identification data of "yyyyyy" is associated with the feature information (feature amount) of User 1, "ttttt" as the terminal identifier of the portable terminal apparatus 120 used by User 1, and File 2 registered in the server apparatus 200 by User 1.

FIG. 7B illustrates attribute information after identification data of User 2 has been acquired. In the specific example illustrated in FIG. 7B, identification data of "zzzzzz" is acquired from a portable terminal apparatus 120 of User 2 in close proximity communication, in a case where User 2 holding the portable terminal apparatus 120 approaches the image output apparatus 300. At a time point of the specific example illustrated in FIG. 7B, the image output apparatus 300 does not acquire feature information (feature amount) of User 2, a terminal identifier of the portable terminal apparatus 120 used by User 2, and a file registered in the server apparatus 200 by User 2.

FIG. 8A illustrates attribute information after the feature information of User 2 has been acquired. In the specific example illustrated in FIG. 8A, the image output apparatus 300 inquires feature information corresponding to the identification data of "zzzzzz", to the server apparatus 200. Thus, the feature information (feature amount) of User 2, which has been transmitted from the server apparatus 200 is acquired. "rrrrr" as the terminal identifier of the portable terminal apparatus 120 used by User 2 may be acquired along with the feature information of User 2.

FIG. 8B illustrates attribute information after User 2 has acquired a target file registered in the server apparatus 200. In the specific example illustrated in FIG. 8B, the image output apparatus 300 inquires the target file corresponding to the identification data of "zzzzzz", to the server apparatus 200. Thus, File 3 transmitted from the server apparatus 200 as the target file is acquired.

For example, in a case where the previous use record obtained by User 2 is included in the attribute information managed by the image output apparatus 300, the image output apparatus may determine that a possibility of User 2 using the image output apparatus 300 again is high. The image output apparatus may acquire the target file along with the feature information of User 2, at a time point at which the image output apparatus acquires the feature information of User 2.

Hitherto, the exemplary embodiment of the present invention is described. The exemplary embodiment is merely illustrative in all respects, and do not limit the scope of the present invention. The present invention encompasses various modifications without departing from the essence thereof.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image output system comprising:
   a server apparatus that stores registration information in which feature information of a registered user and a target file registered by the registered user are associated with each other, and generates identification data corresponding to the registration information;
   a terminal apparatus that acquires feature information of a current user requesting an output of an image of the target file, wherein the terminal apparatus stores the identification data obtained from the server apparatus, and is capable of transmitting the identification data through a close proximity communication;
   an image output apparatus that
      receives the identification data from the terminal apparatus in the close proximity communication when the terminal apparatus approaches the image output apparatus within a range capable of establishing the close proximity communication between the terminal apparatus and the image output apparatus,
      obtains an authentication result indicating whether or not two pieces of feature information satisfy a predetermined coincidence condition, by comparing the feature information of the current user to the feature information of the registered user, and
controls the output of the image of the target file in accordance with the authentication result.

2. The image output system according to claim 1, wherein the server apparatus includes
a storage section that stores the registration information,
a generation section that generates identification data corresponding to the registration information, and
a providing section that provides the identification data for the terminal apparatus,
the terminal apparatus includes
a storage section that stores the identification data obtained from the server apparatus, and
a transmission section that transmits the identification data to the image output apparatus in close proximity communication, and
the image output apparatus includes
a receiving section that receives the identification data from the terminal apparatus in the close proximity communication,
an acquisition section that acquires feature information of the current user using the terminal apparatus, and
a control section that controls the output of the image of the target file in accordance with the authentication result obtained by comparing the feature information of the current user to the feature information of the registered user, which is included in the registration information corresponding to the identification data.

3. The image output system according to claim 1, wherein the mage output apparatus compares the feature information of the current user from the terminal apparatus to the feature information of the registered user to obtain the authentication result.

4. The image output system according to claim 1, wherein the server apparatus compares the feature information of the current user from the terminal apparatus to the feature information of the registered user to obtain the authentication result.

5. The image output system according to claim 1, wherein the predetermined coincidence condition means that the registered user coincides with the current user if similarity between the feature information of the registered user and the feature information of the current user is calculated and the calculated similarity exceeds a predetermined threshold.

6. A server apparatus comprising:
a section that acquires feature information of a registered user and a target file registered by the registered user;
a section that stores registration information in which the feature information and the target file are associated with each other;
a section that generates identification data corresponding to the registration information;
a section that transmits the identification data to a terminal apparatus used by a current user, wherein the terminal apparatus stores the identification data obtained from the server apparatus, and the terminal apparatus is capable of transmitting the identification data through a close proximity communication; and
a section that transmits the target file to an image output apparatus by comparing the feature information of the current user to the feature information of the registered user in response to a request for an authentication result from the image output apparatus
in a case that the image output apparatus receives the identification data from the terminal apparatus in the close proximity communication when the terminal apparatus approaches the image output apparatus within a range capable of establishing the close proximity communication between the terminal apparatus and the image output apparatus, and
in a case that the authentication result indicates that two pieces of feature information satisfy a predetermined coincidence condition, the target file is transmitted to an image output apparatus.

7. The server apparatus according to claim 6, wherein the predetermined coincidence condition means that the registered user coincides with the current user if similarity between the feature information of the registered user and the feature information of the current user is calculated and the calculated similarity exceeds a predetermined threshold.

8. An image output apparatus comprising:
a section that receives identification data of registration information in which feature information of a registered user and a target file registered by the registered user are associated with each other, from a terminal apparatus in a close proximity communication when the terminal apparatus approaches the image output apparatus within a range capable of establishing the close proximity communication between the terminal apparatus and the image output apparatus, wherein the identification data is stored in the terminal apparatus;
a section that acquires the feature information of the registered user, which is included in registration information corresponding to the identification data received from the terminal apparatus;
a section that acquires feature information of a current user using the terminal apparatus through the close proximity communication;
a section that acquires the target file according to the feature information of a current user; and
a section that controls an output of an image of the target file in accordance with an authentication result which is obtained by comparing the acquired feature information of the current user to the acquired feature information of the registered user and indicates whether or not the two pieces of feature information satisfy a predetermined coincidence condition.

9. The image output apparatus according to claim 8, wherein the predetermined coincidence condition means that the registered user coincides with the current user if similarity between the feature information of the registered user and the feature information of the current user is calculated and the calculated similarity exceeds a predetermined threshold.

* * * * *